(12) United States Patent
Pixley et al.

(10) Patent No.: US 9,113,473 B2
(45) Date of Patent: Aug. 18, 2015

(54) POWER EFFICIENT WIRELESS RF COMMUNICATION BETWEEN A BASE STATION AND A MEDICAL DEVICE

(75) Inventors: April C. Pixley, Los Altos, CA (US); Cary W R Campbell, Montpelier, VA (US); Steven T. Brandon, Ben Lomond, CA (US)

(73) Assignee: SPINAL MODULATION, INC., Menlo Park, CA (US)

( * ) Notice: Subject to any disclaimer, the term of this patent is extended or adjusted under 35 U.S.C. 154(b) by 725 days.

(21) Appl. No.: 13/425,867

(22) Filed: Mar. 21, 2012

(65) Prior Publication Data

US 2012/0258756 A1  Oct. 11, 2012

Related U.S. Application Data

(60) Provisional application No. 61/472,561, filed on Apr. 6, 2011.

(51) Int. Cl.
 *H04W 52/02* (2009.01)
 *H04W 88/08* (2009.01)
 *H04W 76/04* (2009.01)

(52) U.S. Cl.
 CPC ........ *H04W 76/048* (2013.01); *H04W 52/0216* (2013.01); *Y02B 60/50* (2013.01)

(58) Field of Classification Search
 CPC ............... H04W 52/0206; H04W 52/0212; H04W 52/0216; H04W 52/0274; H04W 52/287; H04W 76/048; Y02B 60/50
 See application file for complete search history.

(56) References Cited

U.S. PATENT DOCUMENTS

| | | | |
|---|---|---|---|
| 6,897,788 B2 * | 5/2005 | Khair et al. | 340/870.16 |
| 7,110,823 B2 | 9/2006 | Whitehurst et al. | |
| 7,460,910 B2 | 12/2008 | Webb | |
| 7,769,454 B2 | 8/2010 | Parkinson et al. | |
| 7,801,620 B2 | 9/2010 | Freeberg | |
| 2007/0049991 A1 | 3/2007 | Klostermann et al. | |
| 2008/0312512 A1 | 12/2008 | Brukalo et al. | |

(Continued)

FOREIGN PATENT DOCUMENTS

WO     2009005957 A1   1/2009
WO   WO 2009/005960    1/2009

OTHER PUBLICATIONS

Notification of International Preliminary Report on Patentability and Written Opinion dated Oct. 17, 2013, in International Patent Application No. PCT/US2012/032197 filed Apr. 4, 2012.

(Continued)

*Primary Examiner* — Fanghwa Wang
(74) *Attorney, Agent, or Firm* — Vierra Magen Marcus LLP (57) ABSTRACT

Specific embodiments of the present invention are for use by a base station (BS) that enables power efficient wireless radio frequency (RF) communication between the BS and a medical device (MD), which may or may not be an implantable medical device (IMD). In an embodiment, once a communication session is established between the BS and the MD, the BS selectively turns a drop link mode on and off. The drop link mode is a communication mode that while turned on (i.e., enabled) reduces and preferably minimizes the length of time that an RF link is maintained between the BS and the MD. In accordance with an embodiment, at any given time during a communication session the drop link mode is either turned on (i.e., enabled) or turned off (i.e., disabled).

26 Claims, 4 Drawing Sheets (56) References Cited

U.S. PATENT DOCUMENTS

2010/0106222 A1\* 4/2010 Lychou et al. .................. 607/60
2010/0114233 A1   5/2010 Von Arx et al.
2010/0249881 A1   9/2010 Corndorf
2011/0063094 A1   3/2011 Meiertoberens et al.

OTHER PUBLICATIONS

Bradley, "Implantable Ultralow-Power Radio Chip Facilitates In-Body Communications," http://rfdesign.com/next_generation_wireless/short_range_wireless/706RFDF1.pdf, www.rfdesign.com, Jun. 2007, 3 pages.

Bradley, "An Ultra Low Power, High Performance Medical Implant Communication System (MICS) Transceiver for Implantable Devices," http://ulpstage.zarlink.com/zarlink/ieee_bcas_cp_jan06.pdf, IEEE BIOCAS 2006, Nov. 29, 2006-Dec. 1, 2006, pp. 158-161.

Sivard et al., "The Challenge of Designing In-Body Communications," http://www.eetimes.com/General/PrintView/4025029, EE Times Design, Oct. 26, 2004, 8 pages.

Wu, "Clear Channel Assessment Using TI MSP430 and CC2500 Radio," SLAA365 Application Report, Texas Instruments, Jul. 2007, pp. 1-26.

ZL70101, "Medical Implantable RF Transceiver," Short Form Data Sheet, Zarlink Semiconductor Inc., Dec. 2009, pp. 1-9.

ZL70102, "Medical Implantable RF Transceiver MICS RF Telemetry," Short Form Data Sheet, Zarlink Semiconductor Inc., 2010, pp. 1-16.

International Search Report and Written Opinion dated Jul. 19, 2012, in PCT/US12/32197.

Extended European Search Report dated Dec. 4, 2014, in European Patent Application No. 12767290.5 filed Apr. 4, 2012.

\* cited by examiner

POWER EFFICIENT WIRELESS RF COMMUNICATION BETWEEN A BASE STATION AND A MEDICAL DEVICE

PRIORITY CLAIM

The present application claims priority under 35 U.S.C. 119(e) to U.S. Provisional Patent Application No. 61/472,561, entitled POWER EFFICIENT WIRELESS RF COMMUNICATION BETWEEN A BASE STATION AND A MEDICAL DEVICE, filed Apr. 6, 2011, which is incorporated herein by reference.

FIELD OF THE INVENTION

Embodiments of the present invention generally relate to wireless communication between a base station and a medical device, which may or may not be implanted, and related methods, devices and systems.

BACKGROUND OF THE INVENTION

A medical device (MD) can be implanted in a patient for various different purposes, including, but not limited to, treating physiologic conditions, monitoring physiological conditions, treating neurological conditions, monitoring neurological conditions, diagnosing diseases, treating diseases, or restoring functions of organs or tissues. Where the MD is implanted, it is often referred to as an implantable medical device (IMD). Examples of IMDs include, but are not limited to, implantable neurostimulators, implantable cardiac rhythm management devices (e.g., implantable cardioverter defibrillators and pacemakers) and drug delivery devices. Because such a device may be implanted in a patient for a long time, the size and power consumption of the device are inherently constrained. For this and other reasons, an IMD may depend on an external (i.e., non-implanted) system, generically referred to as a base station (BS), to perform certain functions. Such a non-implanted BS can be a patient programmer, a clinician programmer or a remote monitoring device, but is not limited thereto.

An implantable neurostimulator (INS) is an IMD that performs neurostimulation, which has become an accepted treatment for patients with chronic pain in their back and/or limbs who have not found pain relief from other treatments. In general, neurostimulation involves applying an electrical current to nerve tissue in the pathway of the chronic pain. This creates a sensation that blocks the brain's ability to sense the previously perceived pain. There are two conventional forms of electrical stimulation commonly used to treat chronic pain: Spinal Cord Stimulation (SCS) and Peripheral Nerve Field Stimulation (PNFS). In SCS, electrical leads are placed along the spinal cord. A programmable INS is typically implanted in the upper buttock or abdomen (under the skin) and emits electrical currents to the spinal cord via electrodes of the leads. Peripheral nerve field stimulation is similar to spinal cord stimulation, however peripheral nerve field stimulation involves placing the leads just under the skin in an area near to the peripheral nerves involved in pain.

Wireless communication between an IMD and an external BS is often referred to as telemetry. Examples of specific telemetry functions include, but are not limited to, programming or instructing the IMD to perform certain therapeutic tasks and/or adjust certain therapeutic parameters, downloading firmware upgrades to the IMD, uploading operational status information (e.g., battery and/or impedance measurements) from the IMD, and uploading data stored within the IMD. A useful type of wireless communication is radio frequency (RF) communication since it does not require that the BS and the IMD be very close to one another. Rather, with RF communication the BS and the IMD can be many feet apart while still allowing for reliable communication.

A non-implanted BS and an IMD, such as an INS, can communicate using the Medical Implant Communication Service (MICS) standard, which was defined by the U.S. Federal Communications Commission (FCC) and European Telecommunications Standards Institute (ETSI). The MICS standard uses the RF band between 402 and 405 MHz to provide for bi-directional radio communication with IMDs, such as an INS. The RF band between 402 and 405 MHz can be broken down into multiple channels, e.g., into ten 300 kHz wide channels, but not limited thereto. In 2009 the FCC began referring to the RF band between 402 and 405 MHz as being part of the 401 to 406 MHz Medical Device Radiocommunications (MedRadio) Service band. Accordingly, for the remainder of this description, the RF band between 402 and 405 MHz will be referred to as the MICS/MedRadio band, and the communication standards relating to the MICS/MedRadio band will be referred to as the MICS/MedRadio communication standards.

A non-implanted BS can be powered by a battery or can be plugged into an AC power socket. Even if powered by a battery, the battery of the BS can be relatively easily recharged and/or replaced. By contrast, an IMD, such as an INS, typically must be powered by a battery that is difficult and/or invasive to replace and/or recharge. Additionally, there are size limitations for the battery of an IMD. Thus, it is important for an IMD to conserve as much battery power as possible.

The battery of an IMD, such as an INS, is typically used to provide the energy for delivering stimulation, as well as the energy used to provide wireless communication (also referred to as telemetry) between the IMD and a non-implanted BS. Where RF communication is used, the IMD will typically include an RF transceiver, as will the non-implanted BS. The RF transceiver of the non-implanted BS will typically act as a master device and the RF transceiver of the IMD will typically act as a slave device during the RF communication, but that need not be the case. The RF transceiver of the IMD requires a relatively large amount of energy to maintain an RF link with the RF transceiver of the non-implanted BS. This power usage often increases as the battery voltage of the IMD becomes lower since a battery boost may need to be applied to provide the necessary voltage to the RF transceiver.

BRIEF SUMMARY OF THE INVENTION

Specific embodiments of the present invention are for use by a BS that enables power efficient wireless RF communication between the BS and an MD, which may or may not be an IMD. In accordance with an embodiment, once a communication session is established between the BS and the MD, the BS selectively turns a drop link mode on and off. The drop link mode is a communication mode that while turned on (i.e., enabled) reduces and preferably minimizes the length of time that an RF link is maintained between the BS and the MD. In accordance with an embodiment, at any given time during a communication session the drop link mode is either turned on (i.e., enabled) or turned off (i.e., disabled).

When the drop link mode is turned on an RF link between the BS and the MD is only established when the BS is to send a command to the MD, and the RF link is terminated when (e.g., as soon as, or within a predetermined amount of time after) the BS receives a command response from the MD.

While the drop link mode is turned off (i.e., not enabled) during a communication session between the BS and the MD, an RF link between the BS and the MD is maintained until a condition is satisfied that causes the RF link to be terminated. An RF link between a BS and an MD is maintained by repetitively sending link maintenance messages back and forth between the BS and the MD (e.g., about every 2 ms, but not limited thereto).

A benefit of maintaining an RF link between a BS and an MD is that it reduces and potentially minimizes communication latency therebetween. However, a disadvantage of maintaining an RF link between a BS and an MD is that the RF transceiver of the MD draws significantly more current from the MD's battery, and thereby consumes significantly more power, when the RF transceiver of the MD is maintaining an RF link than when it is not maintaining an RF link.

In accordance with specific embodiments of the present invention, where the BS knows that it will be sending more than one command (other than a link request) to MD and/or the BS knows that it will be receiving more than one command response to a command (other than a link request response), the BS will turn off the drop link mode to thereby reduce and preferably minimize communication latency between the BS and the MD. Software and/or firmware of the BS can determine, in dependence on a function that the BS is about to perform, how many commands are to be sent from the BS to the MD and how many command responses are to be received by the BS from the MD.

In accordance with specific embodiments, the BS turns on the drop link mode when the BS is to send a single command to the MD in response to which the BS will receive a single command response from the MD. Additionally, or alternatively, the BS can turn on the drop link mode when the BS will not send another command to the MD until the BS receives an input from a user via a user interface of the BS. For example, the BS may be waiting for a user selection before it can send anything further to the MD. Considering that it typically takes a person at least 1 second to make a selection using the user interface, it is power efficient to turn the drop link mode on, drop any link currently established, and then establish another RF link once the person has entered their selection. Additionally, or alternatively, the BS can turn on the drop link mode when the BS will not send another command to the MD within a predetermined amount of time (e.g., 1 second, or some other specified time). In accordance with a specific embodiment, while the drop link mode is turned on, a total amount of time from establishing an RF link to terminating the RF link is preferably no longer than ten seconds, and is preferably less than an average of one second.

As mentioned above, the BS can maintain the RF link between the BS and the MD by transmitting link maintenance messages to the MD, in response to which the MD will send link maintenance messages (assuming the MD successfully receives the link maintenance messages from the BS). The BS may thereafter terminate the RF link between the BS and the MD for various different reasons, including, but not limited to, the BS turns on the drop link mode, the BS executes an instruction to terminate the RF link, or the BS does not receive a link maintenance message or a command response from the MD for a link time-out period (e.g., 30 seconds, or some other specified time).

In accordance with an embodiment, when establishing an RF link, the BS transmits to the MD (along with a device identifier that enables the MD to determine whether a transmission from the BS is intended for the MD), a channel identifier that informs the MD of the RF channel over which the BS is transmitting. This enables the MD to tune to the RF channel over which the BS is transmitting if the MD happens to be tuned to a different RF channel.

This summary is not intended to summarize all of the embodiments of the present invention. Further and alternative embodiments, and the features, aspects, and advantages of the embodiments of invention will become more apparent from the detailed description set forth below, the drawings and the claims.

DETAILED DESCRIPTION

The following description is of various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout. In addition, the first digit of a reference number identifies the drawing in which the reference number first appears.

Embodiments of the present invention generally relate wireless communication between a BS and an MD, which may or may not be an IMD, and related methods, devices and systems. Accordingly, an exemplary system in which embodiments of the present invention could be implemented will first be described with reference to FIGS. 1-3. Nevertheless, as will be appreciated from the discussion below, embodiments of the present invention are not limited to use with the exemplary system described below.

Exemplary Neurostimulation System

Figure 1:
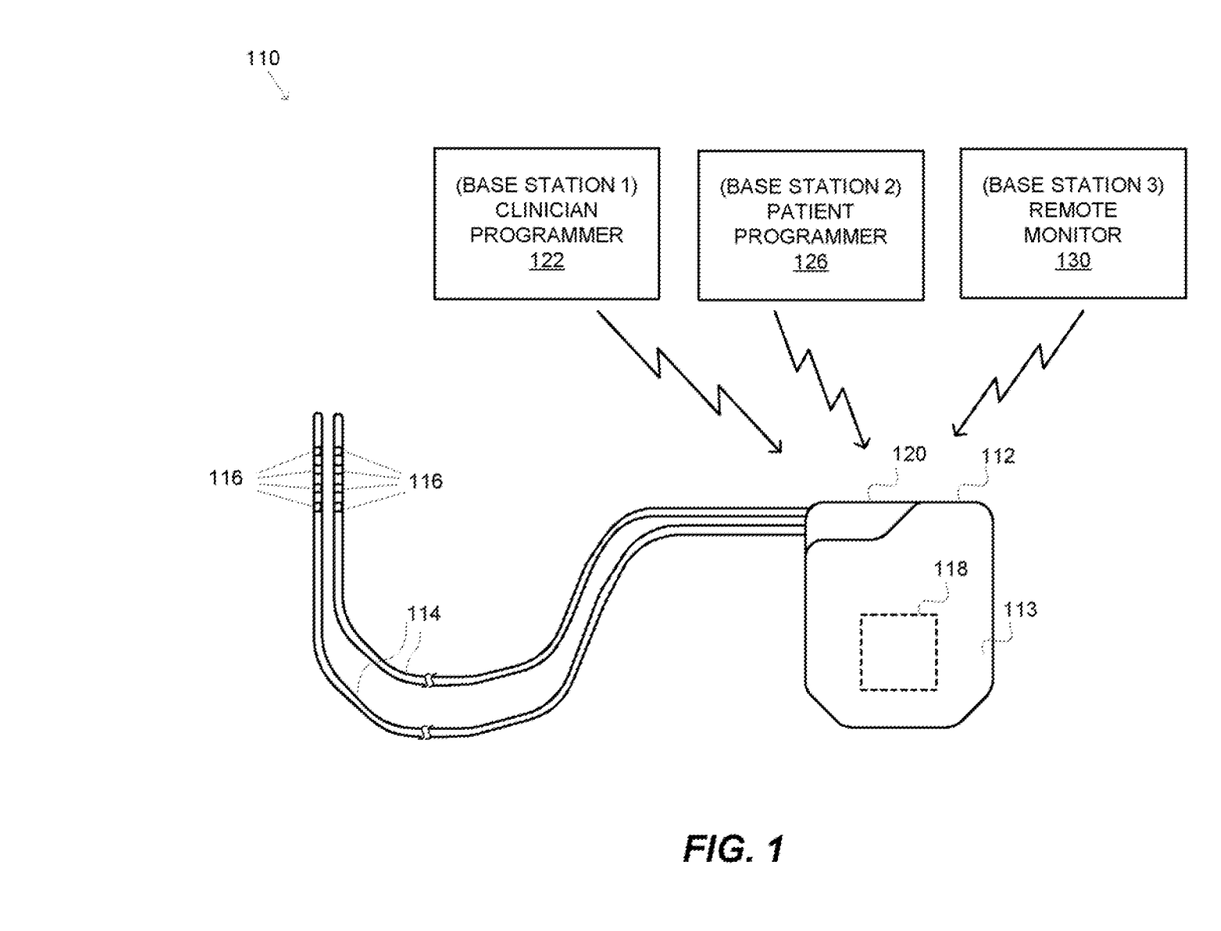
FIG. 1 illustrates an exemplary neurostimulation system with which embodiments of the present invention can be used.

An example neurostimulation system 110 is illustrated in FIG. 1. The system 110 includes an implantable neurostimulator (INS) 112, which is sometimes also referred to as an implantable pulse generator (IPG). The INS 112 is typically implantable in a subcutaneous pocket within a patient's body. One or more leads 114 are connected to the INS 112, with each lead including one or more electrodes 116. For example, four leads 114 can be connected to the INS 112, with each lead including four electrodes 116. Alternatively, more or less leads can be used, with more or less electrodes per lead. The INS 112 includes electronic circuitry 118 contained within a housing 113 (also referred to as the "case" or "can") of the INS. The electrodes 116 are electrically coupled to the electronic circuitry 118 by coupling the leads 114 to a connector 120 of the INS 112. Although not limited thereto, one or more leads 114 can be positioned so that the electrodes are disposed on or near a dorsal root ganglion so that the dorsal root ganglion can be electrically stimulated. Additional details regarding such stimulation are provided in U.S. Pat. No. 7,450,993, entitled "Methods for Selective Stimulation of a Ganglion", and U.S. patent application Ser. No. 12/607,009, entitled "Selective Stimulation Systems and Signal Parameters for Medical Conditions", both of which are incorporated herein by reference.

The electronic circuitry 118 can be used to generate and provide an electrically stimulating signal (also referred to as a neurostimulation signal, a neurostimulation waveform, or simply a stimulation signal) to a nerve tissue via at least two of the electrodes 116, with at least one of the electrodes connected as an anode, and at least one of the electrodes connected as a cathode. As will be described in more detail with reference to FIG. 2, the electronic circuitry 118 includes an RF transceiver for supporting RF communication between the INS 112 and a non-implanted BS. The BS can be a programmer or a remote monitor, as explained below.

There are generally two types of programmers, both of which can be handheld and capable of wireless communication with the INS 112. The programmer represented by block 122, which is often referred to as a "clinician programmer", may be used by a representative of the INS manufacturer, a clinician, a physician and/or other medical personnel (collectively referred to hereafter as a "programming person"). Block 126 represents another type of programmer, which is often referred to as a "patient programmer", which is primarily intended to be controlled by the patient within which the INS 112 is implanted. Block 130 represents a remote monitor 130 (e.g., a bedside monitor) that can at predetermined intervals, predetermined times and/or in response to one or more triggering events, attempt to upload information from the INS 112.

The programmer 122 and/or 126 can be used to program various stimulation parameters and/or other instructions into the electronic circuitry 118. In order to do so, the programmer 122 and/or 126 can be used to selectively initiate, control and terminate communication sessions with the electronic circuitry. As will be described in more detail with reference to FIG. 3, a programmer 122 and/or 126 can include one or more processors (which may be part of a controller) and memory that can store one or more code modules that include instructions. The processor(s) can execute instructions of one or more code modules to selectively establish communication sessions with the INS 112. The processor(s) can also execute instructions of one or more code modules to selectively establish, maintain and terminate RF links between the programmer 122 and/or 126 and the INS 112. Additionally, the processor(s) can also execute instructions of one or more code modules to perform programming of the INS 112 based on feedback from the patient during a programming protocol. For example, the external programmer 122 or 126 can transmit instructions to the INS 112 that instruct the INS to test specific neurostimulation parameters, adjust certain parameters and/or program certain parameters as those to be used by the INS for treatment of chronic pain. The external programmer 122 or 126 may include (or be coupled to) an RF transceiver that communicates with the electronic circuitry 118 via RF signals. Regardless whether the RF transceiver is within the programmer or coupled to the programmer, the programmer can be said to include an RF transceiver.

Neurostimulation parameter information can define how neurostimulation (also referred to simply as stimulation) is to be delivered using one or more leads. Such information can include lead selection information, electrode configuration information and stimulation waveform information. For example, such information can specify how each of the multiple electrodes (e.g., four electrodes) of each lead (e.g., four leads) is to be configured (i.e., as an anode electrode, a cathode electrode, or an inactive electrode), and can specify an amplitude, a pulse width and a pulse repetition rate of the stimulation waveform to be delivered using each lead.

In accordance with an embodiment, an external programmer (e.g., a clinician programmer 122) wirelessly transmits neurostimulation parameter information data to the INS 112. More generally, data that is transmitted from an external programmer to the INS 112, which is used by the INS to generate and deliver neurostimulation signals, can be referred to as neurostimulation data. There are many ways to organize information that defines neurostimulation to be delivered by an INS other than those exemplary ways described herein, and such other ways can also be used to generate neurostimulation data, while being within the scope of the present invention.

Figure 2:
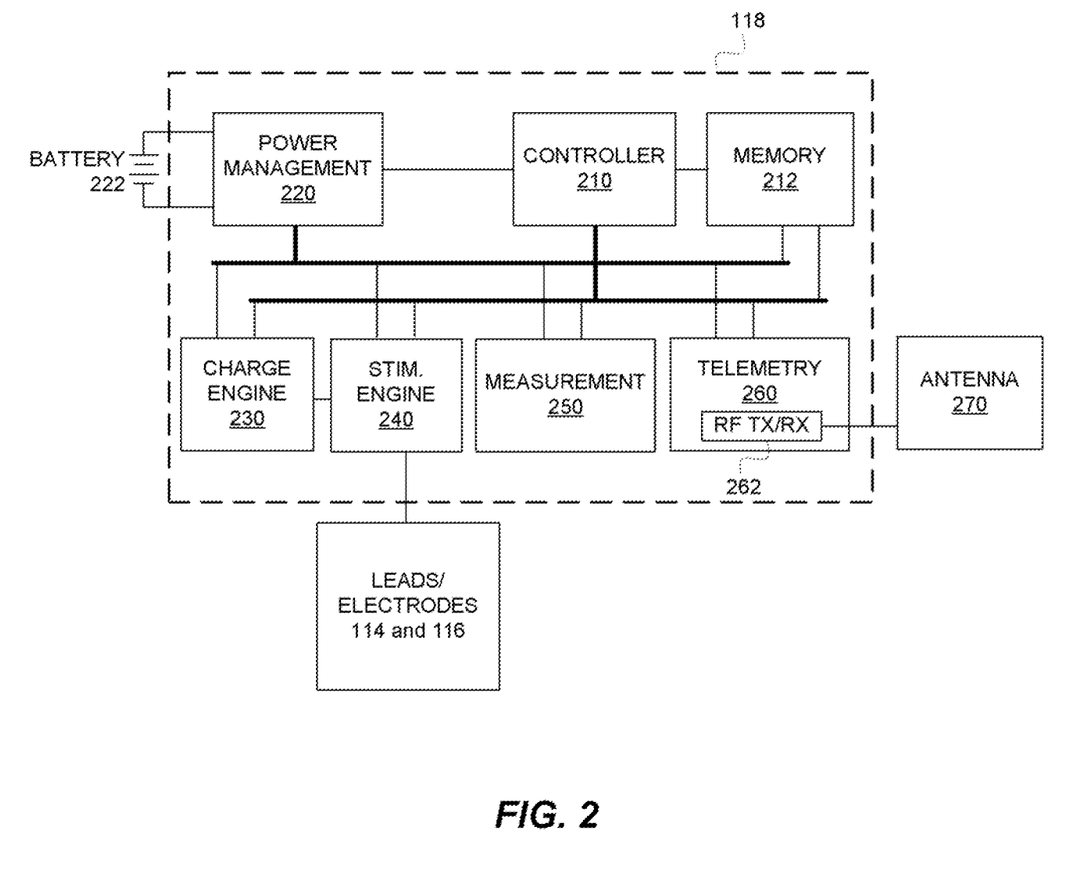
FIG. 2 is a high level block diagram used to describe exemplary electronic circuitry of the implantable neurostimulator shown in FIG. 1.

When the INS 112 receives neurostimulation data from the external programmer, the INS 112 can store the data in a portion of memory (e.g., 212), such as, but not limited to, in non-volatile memory (e.g., flash).

Exemplary Circuitry of INS

FIG. 2 will now be used to describe exemplary details of the electronic circuitry 118 of the INS 112. Referring to FIG. 2, the INS 112 is shown as including a controller 210, memory 212, power management circuitry 220, charge engine circuitry 230, stimulation engine circuitry 240, measurement circuitry 250 and telemetry circuitry 260. The controller 210 can include a microprocessor, a microcontroller, a digital signal processor (DSP), an application specific integrated circuit (ASIC), a field-programmable gate array (FPGA), a state machine, or similar discrete and/or integrated logic circuitry. In a specific embodiment, the controller 210 is implemented using a microcontroller unit (MCU), which can include one or more processors. A microcontroller or DSP can similarly include one or more processors.

The memory 212 can include volatile and/or non-volatile memory including, but not limited to, RAM, ROM, NVRAM, EEPROM, flash memory, and the like. The memory 212 can store neurostimulation data which can include electrode configuration information and stimulation waveform information.

The power management circuitry 220 is shown as being connected to a battery 222, and is used to generate the appropriate voltage and/or current levels for powering the various other circuitry. Accordingly, the power management circuitry 220 can include one or more DC-DC converters, such as, but not limited to, boost and/or buck converters. Additionally, or alternatively, the power management circuitry 220 can include other types of voltage generators. The power management circuitry 220 can also monitor the remaining battery life of the battery 222, so that a patient and/or medical personnel can be informed when the battery 222 needs to be replaced, or possibly recharged. Where the INS 112 includes only a single battery 222, that battery is used to provide the energy for delivering stimulation, as well as the energy used to provide wireless communication (also referred to as telemetry) between the INS 112 and a non-implanted BS. It is also possible that the INS 112 includes more than one battery 222. For example, one battery can be used to provide the energy for delivering stimulation, while a second battery is used to provide wireless communication between the IMD and a non-implanted BS.

While not shown in FIG. 1 or 2, the INS 112 can include control capacitors that store charges used to maintain, adjust and/or otherwise control charges stored by therapy output capacitors, wherein the therapy output capacitors are used to deliver stimulation to patient tissue. The charge engine circuitry 230 can include and be used to charge up such control capacitors. The charge engine 230 can also be used to sample the voltages stored on the therapy s-tof-age output capacitors to make sure the appropriate charges are maintained and/or changed as necessary.

The stimulation engine circuitry 240 is shown as being electrically connected to one or more leads 114, wherein each lead includes at least two electrodes 116. For the remainder of this discussion, unless stated otherwise, it will be assumed that the implantable system 110 includes four leads, each of which includes four electrodes. However, more or less leads, and more or less electrodes per lead are possible, and within the scope of the present invention. The stimulation engine 240 can include switches that are used to select specific leads and configure electrodes of selected leads as an anode, a cathode or as an inactive electrode.

The measurement circuitry 250 can be used, e.g., to measure lead impedance, lead output current, lead output voltage, battery voltage and battery current, but is not limited thereto.

The telemetry circuitry 260 can include a radio frequency (RF) transceiver 262 electrically connected to an antenna 270, e.g., by a coaxial cable or other transmission line. The RF transceiver 262 can include any well known circuitry for transmitting and receiving RF signals via the antenna 270 to and from an RF transceiver of a non-implanted BS, such as a clinician programmer, a patient programmer and/or a remote monitoring unit (e.g., 122, 126 and/or 130). Such transceivers are available from various companies, such as, but not limited to, Zarlink Semiconductor Inc., headquartered in Ottawa, Canada.

In general, the electronic circuitry 118 can be used to communicate with a non-implanted BS, generate neurostimulation signals, and control switches to couple stimulation energy to selected electrodes of a selected lead. The stimulation pulses can be generated in accordance with parameters specified by neurostimulation data stored within the memory 212. Exemplary programmable parameters that can be specified include the pulse amplitude, pulse width, and pulse repetition rate (also known as pulse frequency) for a neurostimulation waveform (also known as a neurostimulation signal), as was mentioned above.

Exemplary Base Station

Figure 3:
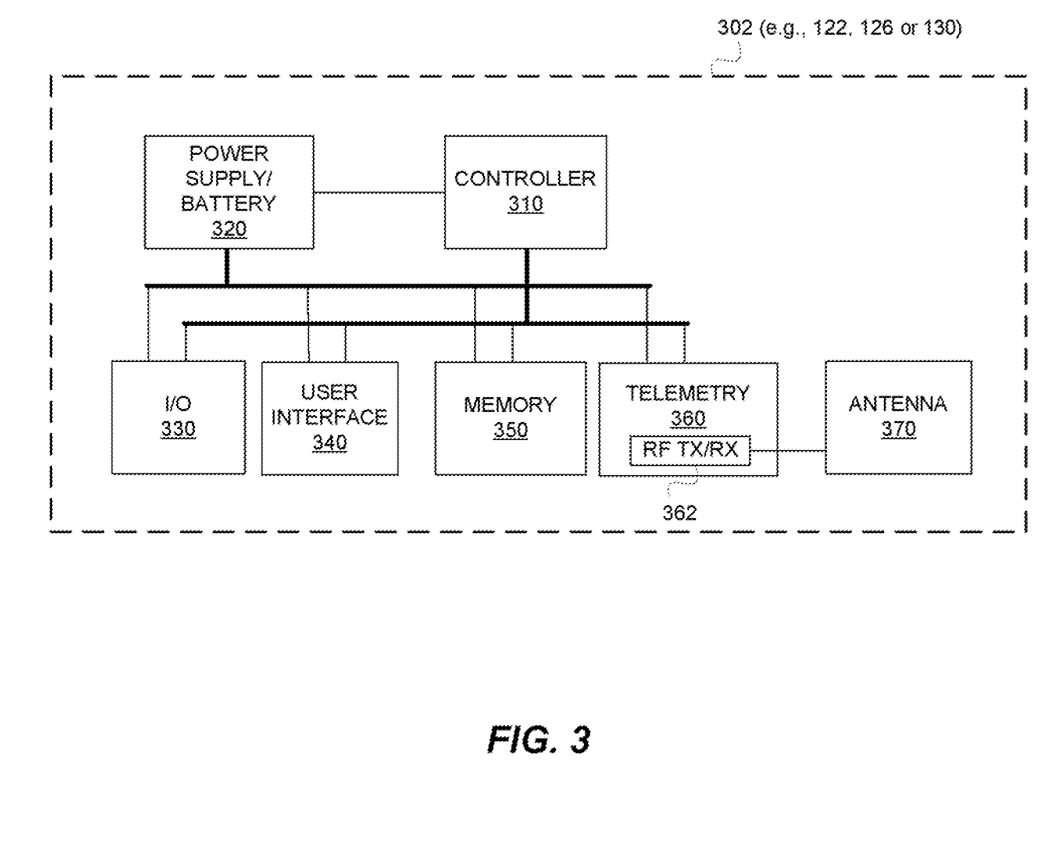
FIG. 3 is a high level block diagram illustrating exemplary components of any one of the non-implanted base stations shown in FIG. 1.

FIG. 3 is a high level block diagram illustrating exemplary components of a non-implanted base station (BS) 302. The BS 302 can be the clinician programmer 122, the patient programmer 126 or the remote monitoring device 130 shown in FIG. 1, but is not limited thereto. The BS 302 is shown as including a controller 310, a power supply 320, input/output (I/O) circuitry 330, a user interface 340, memory 350, telemetry circuitry 360 and an antenna 370.

The power supply 320, which can include a battery, is used to power the various other components of the BS 302. As such, the power supply 320 can be coupled to the controller 310, the I/O circuitry 330, the user interface 340, the memory 350 and the telemetry circuitry 360. The power supply 320 can include, e.g., a voltage regulator to step up or step down a voltage provided by a battery or an external power source to produce one or more predetermined voltages useful for powering the components of the BS 302.

The telemetry circuitry 360 can include an RF transceiver 362 electrically connected to the antenna 370, e.g., by a coaxial cable or other transmission line. Such an RF transceiver 362 can include any well known circuitry for transmitting and receiving RF signals via the antenna 370 to and from an RF transceiver of a medical device, such as the INS 112. Such transceivers are available, e.g., from companies such as Zarlink Semiconductor Inc., headquartered in Ottawa, Canada.

A programming person or patient may interact with the controller 310 via the user interface 340 in order to test various neurostimulation parameters, input user feedback, select preferred or optimal programs, adjust stimulation parameters (e.g., pulse amplitude) and the like. The user interface 340 can include a display, buttons, a keypad, a touch screen, a graphical user interface (GUI), one or more peripheral pointing devices (e.g., a mouse, touchpad, joystick, trackball, etc.), and/or the like, but is not limited thereto. More generally, the user interface enables a programming person or patient to interact with the BS 302.

The controller 310 can include a microprocessor, a microcontroller, a digital signal processor (DSP), an application specific integrated circuit (ASIC), a field-programmable gate array (FPGA), a state machine, or similar discrete and/or integrated logic circuitry. In a specific embodiment, the controller 310 is implemented using a microcontroller unit (MCU), which can include one or more processors. A microcontroller or DSP can similarly include one or more processors. The controller 310 can, e.g., collect information relating to tested electrode parameters (e.g., combinations) and neurostimulation signal parameters, and store the information in the memory 350 for later retrieval and review by a clinician, physician or by the controller 310 to facilitate identification of one or more preferred sets of neurostimulation parameters. The controller 310 can send instructions to the INS 112 via the telemetry circuitry 360 to cause the testing of various neurostimulation parameters. For example, the controller 310 can effectuate the testing of neurostimulation parameter sets created by the controller 310 or a programming person.

The I/O circuitry 330 can include transceivers for wireless communication, ports for wired communication and/or communication via removable electrical media, and/or appropriate drives for communication via removable magnetic or optical media.

The memory 350 can include any volatile, non-volatile, fixed, removable, magnetic, optical, or electrical media, such as a RAM, ROM, CD-ROM, hard disk, removable magnetic disk, memory cards or sticks, VRAM, NVRAM, EEPROM, flash memory, and the like. The memory 350 can include program instructions that, when executed by the controller 310, cause the BS 302 to perform at least some of the functions described herein. For example, the controller 310 can execute program instructions that control RF communication between the BS 302 and the INS 112. For another example, the controller 310 can execute program instructions that specify protocols for testing various neurostimulation parameter sets and selecting one or more preferred neurostimulation parameter sets. The memory 350 can also store one or more neurostimulation parameter sets determined to treat targeted pain for a patient, along with information about the patient.

In some embodiments, the present invention includes a computer program product which is a non-transitory storage medium or computer readable medium (media) having instructions stored thereon/in which can be used to program one or more processors to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, NVRAMS, VRAMs, flash memory devices, magnetic or optical cards, nanosystems (including molecular memory ICs), or any type of media or device suitable for storing instructions and/or data.

RF Communication

As mentioned above, one or more battery (e.g., 222) of an IMD, such as an INS 112, is/are used to provide the energy for delivering stimulation and to provide the energy used to provide wireless communication (also referred to as telemetry) between the implanted medical device and a non-implanted BS 302. Accordingly, battery power can be conserved by reducing power used to deliver stimulation as well as by reducing power used to provide wireless communication. Embodiments of the present invention focus on reducing power used to provide wireless communication.

As also mentioned above, where RF communication is used, the IMD device will typically include an RF transceiver (e.g., 262), as will the non-implanted BS. The RF transceiver (e.g., 362) of the non-implanted BS will typically act as a master device and the RF transceiver (e.g., 262) of the IMD will typically act as a slave device during the RF communication, but that need not be the case. The RF transceiver of the IMD requires a relatively large amount of energy to establish and maintain a communication link with the RF transceiver of the non-implanted BS. Embodiments of the present invention can be used to reduce and preferably minimize power consumption associated with RF communication.

Specific embodiments of the present invention are for use by a BS (e.g., 302) that enables power efficient wireless RF communication between the BS and an MD. Preferably, the BS controls the RF communication between the BS and an MD in a manner that reduces and preferably minimizes that amount of power that the MD needs to use to support the RF communication. The MD can be an INS, such as the INS 112 described with reference to FIGS. 1 and 2, but is not limited thereto. The MD can alternatively be another type of IMD. Where the MD is an IMD, the MICS/MedRadio communication standard can be used. However, embodiments of the invention are not limited to use of the MICS/MedRadio communication standard.

It is also within the scope of the present invention that the MD be a non-implanted MD. For example, the MD can be a non-implanted neurostimulator device that replicates some or all of an INS's functions and can be connected to the patient to evaluate the efficacy of the proposed neurostimulation therapy. Such a non-implanted device is often referred to as a trial neurostimulator (TNS) device. The TNS device can be taped to a patient's back, hooked on a patient's belt, or attached to the patient in some other manner. It is also possible that a non-implanted neurostimulator device, similar to a TNS, can be used for extended periods of time, in which case the non-implanted device may no longer qualify as a "trial" device. When using such a TNS or other non-implanted neurostimulator device, stimulation lead(s) that extend from a non-implanted housing or header of the device can be inserted into the patient (e.g., percutaneously) so that distal portions of the lead(s) are positioned at appropriate locations, e.g., along the spinal cord. It is also possible that a non-implanted MD can be used for some other type of therapy besides neurostimulation. Where the MD is a non-implanted MD, the Wireless Medical Telemetry Service (WMTS) standard, which was defined by the FCC, can be used. However, embodiments of the invention are not limited to use of the WMTS communication standard.

A BS that is the same as, or similar to, the BS that was described above as communicating with an INS can be used to communicate wirelessly with such a non-implanted MD, such as a TNS device. In other words, a BS can be used to wirelessly communicate with multiple types of MDs using RF communication.

It is also noted that while embodiments of the present invention are generally described herein as being used use with a system capable of delivering neurostimulation (e.g., SCS), embodiments of the present invention are not limited to use with such systems. Rather, embodiments of the present invention can be used to support communication between any BS and any MD. For example, the MD can be an implantable cardioverter defibrillator and/or pacemaker, and the BS can be an external programmer configured to communicate with the cardioverter defibrillator and/or pacemaker. For another example, the MD can be an implantable drug pump, and the BS can be a non-implanted programmer configured to communicate with the drug pump. For still another example, the MD can be a non-implanted ambulatory hemodynamic monitor that a patient carries around (e.g., in a pocket or attached to a belt), and the BS can be a non-implanted programmer or a bedside monitor configured to communicate with the ambulatory monitor. These are just a few examples, which are not meant to be limiting.

A "communication session", as the term is used herein, refers a time period over which there is a desire to transfer data between a BS and an MD. In specific embodiments of the present invention, a drop link mode, which is explained below, is either turned on (i.e., enabled) or turned off (i.e., disabled) at any given time during a communication session.

A BS (e.g., a patient programmer or clinician programmer) may start a communication session between the BS and an MD in response to a programming person or a patient pressing or otherwise selecting a "connect", "communicate", "start session", "power up" or similar button or user interface on the BS, indicating that the programming person or the patient wants the BS to communicate with the MD. Additionally, or alternatively, a BS (e.g., a remote monitor) may start a communication session between the BS and an MD at predetermined intervals, predetermined times and/or in response to one or more triggering events. A communication session may end in response to a programming person or a patient pressing or otherwise selecting a "disconnect", "end communications", "end session", "power down", "exit" or similar button or user interface on the BS, indicating that the programming person or the patient no longer wants the BS to communicate with the MD. Additionally, or alternatively, a BS (e.g., a remote monitor) may end a communication session between the BS and an MD after a requested communication between the BS and the MD is complete (e.g., after data has already been transferred between the BS and the MD and there is no more data to be transferred therebetween for at least a predetermined amount of time). A communication session may also be terminated by timing out, e.g., if no command is sent from the BS to the MD within a time out period.

An "RF link", as the term is used herein, refers to a wireless communication path established between a BS and an MD that enables data to be wirelessly transmitted therebetween. An "RF channel", as the term is used herein, refers to a frequency band that can be used support an RF link. For example, within the 402 MHz to 405 MHz MICS/MedRadio band there are ten 300 kHz wide RF channels, any one of which can be used to support an RF link. In an embodiment, while an RF channel is supporting an RF link that is being maintained between a BS and an MD, that RF channel should not be used by any other devices within communication range of the BS and/or the MD.

To effect communications between a BS and an MD over an RF link, an RF carrier signal modulated with digital data is transmitted wirelessly between the antenna of the BS and the antenna of the MD. A demodulator for extracting digital data from the carrier signal is incorporated into each RF transceiver, and a modulator for modulating the carrier signal with digital data is also incorporated into each RF transceiver. The RF transceivers of the BS and the MD are each tunable and may be switched among a plurality of RF channels which differ in frequency. A controller of the MD can also selectively enable or disable the RF transceiver of the MD, or portions of the RF transceiver, in order to conserve power.

In accordance with an embodiment, in order for a BS to establish an RF link with an MD the BS performs a clear channel assessment (CCA) in which the RF transceiver of the BS scans the available channels to select a channel to use for supporting the RF link. Performing a CCA increases the probability that the BS selects a channel (e.g., a MICS/MedRadio channel) that is not already being used to support an RF link. In one embodiment, the BS performs the CCA to identify which channel has the lowest ambient signal level, i.e., the least-noisy channel. For example, where the 402 to 405 MHz MICS/MedRadio band is being used, the BS may scan all 10 of the 300-kHz wide RF channels to detect the least-noisy channel. In another embodiment, the BS performs a CCA to identify the first available channel that provides an acceptable amount of power. Other types of channel selection criteria are also possible as part of a CCA. Once the BS identifies a channel that satisfies its channel selection criteria, the BS can transmit over the selected channel (e.g., over the least-noisy channel) to the MD a link request that includes a unique device identifier (e.g., a serial number, but not limited thereto) of the MD with which the BS wants to communicate.

When there is no RF link established between an MD and a BS, the MD will periodically sniff a plurality of (e.g., ten) RF channels for the presence of a signal (which can include a link request) being transmitted by a BS. If the transceiver of the MD detects what appears to be a signal from a BS, the transceiver of the MD will tune to the channel over which transceiver believes the BS is transmitting (e.g., the channel on which the highest signal power is detected by the MD) and will demodulate the signal. If the demodulated signal includes a link request, then the MD will compare the unique device identifier in the link request to its own unique device identifier, and if they match, then the MD will transmit a link request response to the BS informing the BS that the MD is present and available to communicate. At this point an RF link has been established between the BS and the MD. As will be discussed below, the aforementioned link establishment procedure may result in the transceiver of the MD being tuned to the wrong RF channel, e.g., the transceiver of the MD may be tuned to an RF channel that is adjacent to, or even two or three channels over from, the RF channel over which the BS is transmitting. Specific embodiments of the present invention, discussed below, address this potential problem.

As the term is used herein, a "command" is any message sent from a BS to an MD other than link requests, housekeeping messages and link maintenance messages. As the term is used herein a "command response" is any message sent from an MD to a BS, in response to a command, other than link request responses, housekeeping messages and link maintenance messages.

Commands send from a BS to an MD, and command responses sent from the MD to the BS, are sent as packets. In accordance with an embodiment, each complete packet includes a packet preamble, a packet header and packet user data blocks. There is a maximum amount of data blocks that can be included in a single packet. This is one of the reasons that a BS may need to send more than one command to an MD, and why an MD may need to send more than one command response to a BS in response to a command received from the BS. In other words, due to limitations as to how many data blocks can be included in a single packet, there is sometimes a need to transfer data from a BS to an MD, or vice versa, as multiple packets (and thus, as multiple commands and/or command responses). It is also possible that certain types of packets include only a preamble and a header, such as, but not limited to, housekeeping and link maintenance message types of packets.

Once an RF link has been established between a BS and an MD, the BS can send a command to the MD, in response to which that BS expects to receive one or more command responses, depending on the specific command sent. For example, the BS can send a data request command to the MD that instructs the MD to upload certain data stored within the MD to the BS. Such a data request command can, e.g., instruct the MD to upload its present stimulation settings, which can include lead and electrode configuration information and pulse parameter (e.g., pulse amplitude, pulse width and pulse repetition rate) information, but is not limited thereto. Since a data request command is requesting that data be uploaded to the BS from the MD, this type of command can also be referred to as a data upload command. The MD's response to a data request command may require multiple command responses since, as mentioned above, there is a maximum amount of data that can be transferred in a single command response.

The BS can also send a data download command to the MD that instructs the MD to overwrite certain data stored within the MD with new data provided by the BS, e.g., new lead and electrode configuration information and/or pulse parameter information. A data download command may also be used to upgrade firmware of the MD. The BS may need to send multiple data download commands to the MD since there is a maximum amount of data that can be transferred in a single command sent by the BS. Each time the MD receives a data download command it will respond with an acknowledgement (ACK) command response if the MD successfully downloads the data.

The BS can also send an instruction command to the MD that, e.g., instructs the MD to adjust a stimulation pulse parameter (e.g., increase pulse amplitude) or instructs the MD to switch to delivering neurostimulation in accordance with a different one of a plurality of programmed stimulation sets, but is not limited thereto. Each time the MD receives an instruction command it will respond with an acknowledgement (ACK) command response if the MD successfully received the instruction command.

Other types of commands that the BS can send to the MD include a perform battery measurement command and an impedance measurement command. These two types of commands can include, e.g., lead and electrode configuration information and/or pulse parameter information along with an instruction that measurement(s) be made and that results of the measurement(s) be sent back to the BS in a command response.

A "drop link mode", as the term is used herein, is a communication mode of an embodiment of the present invention that while turned on (i.e., enabled) reduces and preferably minimizes the length of time that an RF link is maintained between the BS and the MD. In accordance with an embodiment, at any given time during a communication session the drop link mode is either turned on (i.e., enabled) or turned off (i.e., disabled). More specifically, when the drop link mode is turned on an RF link between the BS and the MD is only established (using a link request and a link request response) when the BS is to send a command to the MD, and the RF link is terminated when (e.g., as soon as, or within a predetermined amount of time after) the BS receives a command response from the MD. By contrast, while the drop link mode is turned off (i.e., not enabled) during a communication session between the BS and the MD, an RF link between the BS and the MD is maintained until a condition is satisfied that causes the RF link to be terminated. An RF link between a BS and an MD is maintained by repetitively sending link maintenance messages back and forth between the BS and the MD (e.g., about every 2 ms, but not limited thereto). As was mentioned above, a link maintenance message may be a packet that includes a packet preamble and a packet header, without including any data blocks following the packet header.

A benefit of maintaining an RF link between a BS and an MD is that it reduces and potentially minimizes communication latency therebetween. However, a disadvantage of maintaining an RF link between a BS and an MD is that the RF transceiver of the MD draws significantly more current from the MD's battery, and thereby consumes significantly more power, when the RF transceiver of the MD is maintaining an RF link than when it is not maintaining an RF link.

In accordance with specific embodiments of the present invention, where the BS knows that it will be sending more than one command (other than a link request) to an MD and/or the BS knows that it will receive more than one command response to a command (other than a link request response) from an MD, the BS will turn off the drop link mode to thereby reduce and preferably minimize communication latency between the BS and the MD. Software and/or firmware of the BS can determine, in dependence on a function, instruction or a request that the BS is about to perform, how many commands are to be sent from the BS to the MD and how many command responses are to be received by the BS from the MD. More generally, the BS can be programmed to determine when to turn the drop link mode on and when to turn the drop link mode off.

In accordance with an embodiment, whenever a BS initiates a communication session between the BS and an MD, the drop link mode is turned off (by default, or actively), and an RF link is established between the BS and the MD. This is because the BS may be programmed such that whenever it initiates a communication session with an MD the BS will need to send more than one command to the MD and/or the BS will need to receive more than one command response from the MD. For example, the BS (e.g., a clinician programmer or a patient programmer) may need to send an upload command request whenever a communication session is initiated so that the BS knows the present stimulation settings of the MD, thereby enabling the BS to be used for adjusting such settings.

In accordance with an embodiment, after a communication session has been established, and there are no more commands or command responses to be transmitted between BS and the MD until a programming person or a patient interfaces with the user interface of the BS, the drop link mode is turned on and the RF link is terminated. More generally, in accordance with certain embodiments, to conserve power of the MD (and to a lesser extent, to conserve power of the BS), whenever the BS is waiting for a programming person or patient to interface with the user interface of the BS, the BS will automatically turn on the drop link mode (if it was turned off) and will automatically drop an RF link (if an RF link existed).

Figure 4:
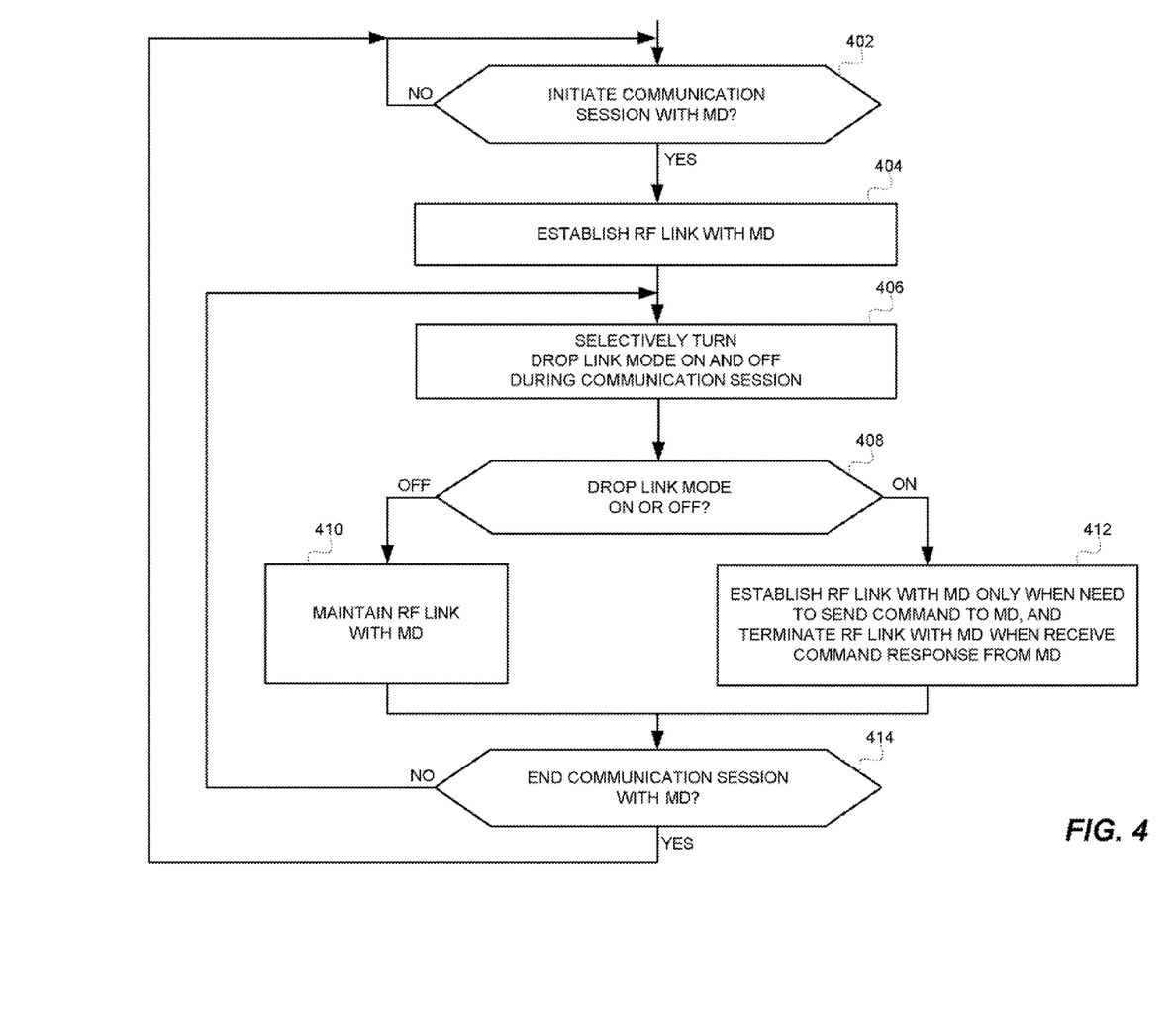
FIG. 4 is a high level flow diagram that is used to summarize specific embodiments of the present invention, for use by a base station, that enable power efficient wireless RF communication between the base station and a medical device.

The high level flow diagram of FIG. 4 will now be used to summarize specific embodiments of the present invention, for use by a BS, that enable power efficient wireless RF communication between the BS and an MD. As indicated at block 402, there is a determination of whether to initiate a communication session with an MD. As was mentioned above, a BS (e.g., a patient programmer or clinician programmer) may start a communication session between the BS and an MD in response to a programming person or a patient pressing or otherwise selecting a "connect", "communicate", "start session", "power up" or similar button or user interface on the BS, indicating that the programming person or the patient wants the BS to communicate with the MD. Additionally, or alternatively, a BS (e.g., a remote monitor) may start a communication session between the BS and an MD at predetermined intervals, predetermined times, and/or in response to one or more triggering events. Other reasons or ways for initiating a communication session between the BS and an MD are also possible, and within the scope of the present invention.

Once it has been determined that the BS is to establish a communication session with an MD, the BS establishes an RF link with the MD, as indicated at step 404. As was mentioned above, in certain embodiments, in order for the BS to establish an RF link with an MD the BS performs a CCA to select a channel to use for supporting the RF link. Once the BS identifies a channel that satisfies its channel selection criteria, the BS can transmit over the selected channel to the MD a link request that include a unique device identifier (e.g., a serial number, but not limited thereto) of the MD with which the BS wants to communicate. The BS will receive a link request response from the MD if the MD detects the signal including the link request and the MD includes a matching unique device identifier, at which point an RF link is established.

Once an RF link has been established, the BS can send one or more commands to the MD, and the MD can send back one or more command responses to the BS. As mentioned above, in an embodiment, whenever the BS initiates a communication session between the BS and the MD, the drop link mode is turned off (by default, or actively). This can be because the BS may be programmed such that whenever it initiates a communication session the BS will need to send more than one command to the MD and/or the BS will need to receive more than one command response from the MD. After a communication session has been established, and there are no more commands or command responses to be transmitted between BS and the MD until a programming person or a patient interfaces with the user interface of the BS, the drop link mode is turned on and the RF link is terminated. More generally, the drop link mode is selectively turned on and off during the communication session, as indicated at step 406. In accordance with an embodiment, whenever the drop link mode is turned on, the BS will automatically drop an RF link (if an RF link existed).

As indicated by steps 408 and 410, while the drop link mode is turned off during the communication session between the BS and the MD, an established RF link between the BS and the MD is maintained. As indicated by steps 408 and 412, while the drop link mode is turned on during the communication session between the BS and the MD, an RF link between the BS and the MD is established only when the BS is to send a command to the MD, and the RF link between the BS and MD is terminated when (e.g., as soon as, or within a predetermined amount of time after) the BS receives a command response from the MD.

As indicated at step 414, a communication session may end. This may occur for any number of reasons. For example, a communication session may end in response to a programming person or a patient pressing or otherwise selecting a "disconnect", "end communications", "end session", "power down", "exit" or similar button or user interface on the BS, indicating that the programming person or the patient no longer wants the BS to communicate with the MD. Additionally, or alternatively, a BS (e.g., a remote monitor) may end a communication session between the BS and an MD after a requested communication between the BS and the MD is complete (e.g., after data has already been transferred between the BS and the MD and there is no more data to be transferred therebetween for at least a predetermined amount of time). A communication session may also be terminated by timing out, e.g., if no command is sent from the BS to the MD within a time out period. Other reasons or ways for ending a communication session between the BS and an MD are also possible, and within the scope of the present invention.

So long as the communication session is not ended, the BS will selectively turn the drop link mode on and off, as indicated by step 406. In accordance with specific embodiments, the BS turns off the drop link mode when the BS is to send a command to the MD that requires multiple command responses from the MD. Additionally, or alternatively, the BS turns off the drop link mode when the BS is to send multiple commands to the MD.

In accordance with specific embodiments, the BS turns on the drop link mode when the BS is to send a single command to the MD in response to which the MD will send a single command response to the BS. Additionally, or alternatively, the BS turns on the drop link mode when the BS will not send another command to the MD until the BS receives an input from a user via a user interface of the BS. For example, the BS may be waiting for a user selection before it can send anything further to the MD. Considering that it typically takes a person at least 1 second to make a selection using the user interface, it is power efficient to turn the drop link mode on, drop any link currently established, and then establish another RF link once the person has entered their selection. Additionally, or alternatively, the BS turns on the drop link mode when the BS will not send another command to the MD within a predetermined amount of time (e.g., 1 second, or some other specified time).

Referring to step 410, the BS can maintain the RF link between the BS and the MD by transmitting link maintenance messages to the MD, in response to which the MD will send link maintenance messages (assuming the MD successfully receives the link maintenance messages from the BS). The BS may thereafter terminate the RF link between the BS and the MD for various different reasons, including, but not limited to, the BS turns on the drop link mode, the BS executes an instruction to terminate the RF link, or the BS does not receive a link maintenance message or a command response from the MD for a link time-out period (e.g., 30 seconds, or some other specified time).

During the communication session between the BS and the MD, while the drop link mode is turned off, the BS may send to the MD a command that requires multiple command responses from the MD, and the BS may receive the multiple command responses from the MD. After the BS receives the multiple command responses from the MD, the BS may turn on the drop link mode and terminate the RF link.

During the communication session between the BS and the MD, while the drop link mode is turned off, the BS may send multiple commands from the BS to the MD, in response to which the BS will receive command responses. After the BS receives the command responses from the MD, the BS may turn on the drop link mode and terminate the RF link.

In accordance with an embodiment, a BS can turn the drop link mode on by default, in order to reduce the amount of time that an RF link exists between the BS and an MD. The BS can then selectively turn off the drop link mode when the BS knows that it is going to be sending multiple commands to the MD and/or the BS knows that it is going to be receiving multiple command responses from the MD. After the BS receives the last expected command response from the MD, the BS can then turn the drop link mode on again. In accordance with an embodiment, whenever a BS turns the drop link mode from off to on, an RF link (if one exists) is automatically terminated.

In accordance with a specific embodiment, whenever a BS turns the drop link mode from on to off, the BS attempts to establish an RF link with an MD.

As mentioned above, whenever an RF link is to be established between a BS and an MD, it is possible that the MD may tune to the wrong RF channel. For example, assume that there are ten possible RF channels (channel #1-channel #10) over which the BS may send a link request. Also assume that as a result of a CCA, the BS transmits the link request over channel #3. While sniffing for a signal from BS, the MD may correctly tune to channel #3, or may incorrectly tune to another channel that is adjacent to channel #3 (e.g., channel #2 or #4), or possible even two or three channels over from channel #3 (e.g., channel #1, #5 or #6). If the MD tunes to the wrong RF channel but successfully demodulates the link request, the MD will send the link request response over the wrong RF channel. This can result in the RF link not being stable. If the BS fails to receive the link request response, the BS can again attempt to send another link request. In the event that the BS receives the link request response sent over the wrong channel, the RF link will most likely fail soon thereafter because of unrecoverable errors resulting from the BS and the MD transmitting on different RF channels. While it is likely that the BS and the MD will eventually establish an RF link where they are both transmitting over the same RF channel, this may cause an undesirable latency. Specific embodiments of the present invention, which shall now be discussed, address this potential problem.

In accordance with an embodiment, when establishing an RF link, the BS transmits to the MD (along with a unique device identifier that enables the MD to determine whether a transmission from the BS is intended for the MD), a channel identifier that informs the MD of the RF channel over which the BS is transmitting. This enables the MD to tune to the RF channel over which the BS is transmitting if the MD happens to be tuned to a different RF channel. If the MD is already tuned to the correct RF channel, the MD need not adjust which channel it is tuned to. In accordance with an embodiment, the channel identifier is included as part of the header of the packet that contains the link request. The same header can also include the unique device identifier of the MD with which the BS wants to communicate. The embodiment where the BS transmits a channel identifier to the MD can be used together with, or independent of, one or more of the above described embodiments that relate to selectively turning on and off the drop link mode.

Embodiments of the present invention have been described above with the aid of functional building blocks illustrating the performance of specified functions and relationships thereof. The boundaries of these functional building blocks have sometimes been defined herein for the convenience of the description. Alternate boundaries can be defined so long as the specified functions and relationships thereof are appropriately performed. Any such alternate boundaries are thus within the scope and spirit of the claimed invention.

Although the foregoing invention has been described in some detail by way of illustration and example, for purposes of clarity and understanding, it will be obvious that various alternatives, modifications and equivalents may be used and the above description should not be taken as limiting in scope of the invention.

What is claimed is:

1. A method for use by a base station (BS) that enables power efficient wireless radio frequency (RF) communication between the BS and a medical device (MD), the method comprising:
   (a) establishing a communication session between the BS and the MD, wherein the communication session comprises a time period over which there is a desire to transfer data between the BS and the MD, and wherein step (a) includes turning off a drop link mode and establishing an RF link between the BS and the MD;
   (b) selectively turning the drop link mode on and off during the communication session between the BS and the MD, wherein step (b) includes turning the drop link mode on when the BS will not send another command to the MD until the BS receives an input from a user via a user interface of the BS;
   (c) while the drop link mode is turned off during the communication session between the BS and the MD, maintaining an already established RF link between the BS and the MD;
   (d) while the drop link mode is turned on during the communication session between the BS and the MD, establishing a new RF link between the BS and the MD only when the BS is to send a command to the MD, and terminating the new RF link between the BS and the MD when the BS receives a command response from the MD; and
   (e) terminating the communication session between the BS and the MD;
   wherein each said RF link comprises a wireless communication path established between the BS and the MD that enables data to be wirelessly transmitted therebetween.

2. The method of claim 1, wherein step (b) also comprises:
   (b.1) turning off the drop link mode when
   the BS is to send a command to the MD in response to which the BS will receive multiple command responses from the MD, and/or
   the BS is to send multiple commands to the MD; and
   (b.2) also turning on the drop link mode when
   the BS is to send a single command to the MD in response to which the BS will receive a single command response from the MD, or
   the BS will not send another command to the MD within a predetermined amount of time.

3. The method of claim 1, wherein step (c) includes:
   (c.1) maintaining the already established RF link between the BS and the MD by transmitting link maintenance messages to the MD; and
   (c.2) terminating the already established RF link between the BS and the MD in response to any of the following conditions occurring
   (i) the BS turns on the drop link mode,
   (ii) the BS executes an instruction to terminate the already established RF link, or
   (iii) the BS does not receive a link maintenance message or a command response from the MD for a link time-out period.

4. The method of claim 1, wherein during the communication session between the BS and the MD, steps (b) and (c) include:
   while the drop link mode is turned off, sending a command from the BS to the MD which requires multiple command responses from the MD;
   while the drop link mode is turned off, receiving, at the BS, the multiple command responses from the MD; and
   after receiving, at the BS, the multiple command responses from the MD, turning on the drop link mode and terminating the already established RF link.

5. The method of claim 1, wherein during the communication session between the BS and the MD, steps (b) and (c) include:
   while the drop link mode is turned off, sending multiple commands from the BS to the MD;
   while the drop link mode is turned off, receiving, at the BS, command responses from the MD in response to the multiple commands; and
   after receiving, at the BS, the command responses from the MD, turning on the drop link mode and terminating the already established RF link.

6. The method of claim 1, wherein during the communication session between the BS and the MD, step (d) includes:
   while the drop link mode is turned on establishing the new RF link between the BS and the MD when the BS is to send a single command to the MD which requires a single command response from the MD;
   sending the single command from the BS to the MD which requires the single command response from the MD;
   receiving, at the BS, the single command response from the MD; and
   terminating the new RF link, as soon as or within a predetermined amount of time after, receiving at the BS the single command response from the MD.

7. The method of claim 1, wherein during the communication session between the BS and the MD, while the drop link mode is turned on, an average total amount of time from establishing the new RF link to terminating the new RF link is less than one second.

8. The method of claim 1, wherein the MD is implanted in a patient and the BS is not implanted.

9. The method of claim 1, wherein the MD and the BS are not implanted.

10. The method of claim 1, wherein:
    the BS comprises a clinician programmer, a patient programmer or a remote monitoring device; and
    the MD comprises a neurostimulator.

11. The method of claim 1, wherein:
    each said RF link can be established using any one of a plurality of different RF channels; and
    when establishing each said RF link, transmitting from the BS to the MD
    a device identifier that enables the MD to determine whether a transmission from the BS is intended for the MD, and
    a channel identifier that informs the MD of the specific one of the RF channels over which the BS is transmitting to thereby enable the MD to tune to the specific RF channel over which the BS is transmitting if the MD is tuned to a different RF channel.

12. A base station (BS), comprising:
    a controller configured to selectively establish, with a medical device (MD), a communication session that comprises a time period over which there is a desire to transfer data between the BS and the MD;
    a user interface configured to accept one or more inputs from a user; and
    an RF transceiver communicatively coupled to the controller and configured to selectively establish a radio frequency (RF) link with an RF transceiver of a medical device (MD) during the communication session between the BS and the MD;

the controller also configured to selectively turn a drop link mode on and off during the communication session between the BS and the MD;

wherein the controller is configured to turn the drop link mode on when the BS will not send another command to the MD until the BS receives an input from a user via the user interface of the BS;

wherein, while the drop link mode is turned off during the communication session between the BS and the MD, the controller controls the RF transceiver of the BS to maintain an already established RF link between the BS and the MD;

wherein, while the drop link mode is turned on during the communication session between the BS and the MD, the controller controls the RF transceiver of the BS to establish a new RF link between the BS and the MD only when the BS is to send a command to the MD, and the controller controls the RF transceiver of the BS to terminate the new RF link between the BS and MD when the BS receives a command response from the MD; and wherein each said RF link comprises a wireless communication path established between the BS and the MD that enables data to be wirelessly transmitted therebetween.

13. The BS of claim 12, wherein the controller includes at least one processor.

14. The BS of claim 12, wherein:
the controller is configured to turn off the drop link mode when
the BS is to send a command to the MD in response to which the BS will receive multiple command responses from the MD, and/or
the BS is to send multiple commands to the MD; and
the controller is also configured to turn on the drop link mode when
the BS is to send a single command to the MD in response to which the BS will receive a single command response from the MD, or
the BS will not send another command to the MD within a predetermined amount of time.

15. The BS of claim 12, wherein:
the controller is configured to terminate the already established RF link between the BS and the MD in response to any of the following conditions occurring
(i) the BS turns on the drop link mode,
(ii) the BS executes an instruction to terminate the already established RF link, or
(iii) the BS does not receive a link maintenance message or a command response from the MD for a link time-out period.

16. A non-transitory computer readable medium, including instructions stored thereon which when read and executed by one or more processors of a base station (BS) cause the one or more processors to perform the steps comprising:
(a) establishing a communication session between the BS and a medical device (MD), wherein the communication session comprises a time period over which there is a desire to transfer data between the BS and the MD, and wherein step (a) includes turning off a drop link mode and establishing an RF link between the BS and the MD;
(b) selectively turning the drop link mode on and off during the communication session between the BS and the MD, wherein step (b) includes turning the drop link mode on when the BS will not send another command to the MD until the BS receives an input from a user via a user interface of the BS;

(c) while the drop link mode is turned off during the communication session between the BS and the MD, maintaining an already established RF link between the BS and the MD;
(d) while the drop link mode is turned on during the communication session between the BS and the MD, establishing a new RF link between the BS and the MD only when the BS is to send a command to the MD, and terminating the new RF link between the BS and the MD when the BS receives a command response from the MD; and
(e) terminating the communication session between the BS and the MD;

wherein each said RF link comprises a wireless communication path established between the BS and the MD that enables data to be wirelessly transmitted therebetween.

17. A method for use by a base station (BS) that enables power efficient wireless radio frequency (RF) communication between the BS and a medical device (MD), wherein the method is for use during a communication session between the BS and the MD, the method comprising:
establishing a communication session between the BS and the MD, wherein the communication session comprises a time period over which there is a desire to transfer data between the BS and the MD;
wherein during the communication session
turning a drop link mode off whenever the BS is to send a command to the MD that requires multiple command responses from the MD, or whenever the BS is to send multiple commands to the MD, and once the drop link mode is turned off establishing a new RF link between the BS and the MD and maintaining the new RF link between the BS and the MD while the BS sends the command to the MD and the BS receives the multiple command responses from the MD; and
turning the drop link mode on whenever the BS is to wait for a user input via a user interface of the BS and an already established RF link exists between the BS and the MD, and once the drop link mode is turned on terminating the already established RF link;
terminating the communication session between the BS and the MD;
wherein each said RF link comprises a wireless communication path established between the BS and the MD that enables data to be wirelessly transmitted therebetween.

18. The method of claim 17, further comprising:
turning the drop link mode on whenever the BS is to send a single command to the MD in response to which the BS will receive a single command response from the MD, and once the drop link mode is turned on establishing the new RF link between the BS and the MD, using the new RF link to send the single command to the MD and to receive the single command response from the MD, and terminating the new RF link as soon as or within a predetermined amount of time after receiving the single command response from the MD.

19. The method of claim 17, further comprising:
whenever the BS is not going to send a command to the MD for at least a predetermined amount of time and an already established RF link exists between the BS and the MD, terminating the already established RF link.

20. A method for use by a base station (BS) that enables power efficient wireless radio frequency (RF) communication between the BS and a medical device (MD), the method comprising:
establishing a communication session between the BS and the MD, wherein the establishing the communication session between the BS and the MD includes turning off a drop link mode and establishing an RF link between the BS and the MD;

selectively turning the drop link mode on and off during the communication session between the BS and the MD, including turning the drop link mode on when the BS will not send another command to the MD until the BS receives an input from a user via a user interface of the BS; and wherein while the drop link mode is turned off during the communication session between the BS and the MD, maintaining an already established RF link between the BS and the MD;

wherein while the drop link mode is turned on during the communication session between the BS and the MD, establishing a new RF link between the BS and the MD only when the BS is to send a command to the MD, and terminating the new RF link between the BS and MD when the BS receives a command response from the MD;

wherein while the drop link mode is turned on, an average total amount of time from establishing the new RF link to terminating the new RF link is less than one second; and wherein each said RF link comprises a wireless communication path established between the BS and the MD that enables data to be wirelessly transmitted therebetween.

21. The method of claim 20, wherein while the drop link mode is turned off during the communication session between the BS and the MD, maintaining an already established RF link between the BS and the MD.

22. The method of claim 20, further comprising:
terminating the communication session between the BS and the MD in response to any one of the following
(i) accepting a selection of a predetermined input from a user of the BS that indicates that the user no longer wants the BS to communicate with the MD;
(ii) determining that no more data is to be transferred between the BS and the MD for at least a predetermined amount of time; or
(iii) determining that no command has been sent from the BS to the MD within a time out period.

23. The method of claim 22, wherein:
the step of establishing the communication session between the BS and the MD occurs in response to any one of the following
accepting a selection of a predetermined input from a user of the BS that indicates that the user wants the BS to communicate with the MD;
determining that a predetermined interval has passed since a most recent communication session;
determining that a predetermined time has occurred; or
determining that a predetermined triggering event has occurred.

24. The method of claim 1, wherein:
step (a) comprises establishing the communication session between the BS and the MD in response to any one of the following
(a.i) accepting a selection of a predetermined input from a user of the BS that indicates that the user wants the BS to communicate with the MD;
(a.ii) determining that a predetermined interval has passed since a most recent communication session;
(a.iii) determining that a predetermined time has occurred; or
(a.iv) determining that a predetermined triggering event has occurred; and step (e) comprises terminating the communication session between the BS and the MD in response to any one of the following
(e.i) accepting a selection of a predetermined input from a user of the BS that indicates that the user no longer wants the BS to communicate with the MD;
(e.ii) determining that no more data is to be transferred between the BS and the MD for at least a predetermined amount of time; or
(e.iii) determining that no command has been sent from the BS to the MD within a time out period.

25. The BS of claim 12, wherein the controller is configured to:
establish the communication session between the BS and the MD in response to any one of the following
accepting a selection of a predetermined input from a user of the BS that indicates that the user wants the BS to communicate with the MD;
determining that a predetermined interval has passed since a most recent communication session;
determining that a predetermined time has occurred; or
determining that a predetermined triggering event has occurred; and
terminate the communication session between the BS and the MD in response to any one of the following
accepting a selection of a predetermined input from a user of the BS that indicates that the user no longer wants the BS to communicate with the MD;
determining that no more data is to be transferred between the BS and the MD for at least a predetermined amount of time; or
determining that no command has been sent from the BS to the MD within a time out period.

26. The method of claim 17, wherein:
the step of establishing the communication session between the BS and the MD occurs in response to any one of the following
accepting a selection of a predetermined input from a user of the BS that indicates that the user wants the BS to communicate with the MD;
determining that a predetermined interval has passed since a most recent communication session;
determining that a predetermined time has occurred; or
determining that a predetermined triggering event has occurred; and
the step of terminating the communication session between the BS and the MD occurs in response to any one of the following
accepting a selection of a predetermined input from a user of the BS that indicates that the user no longer wants the BS to communicate with the MD;
determining that no more data is to be transferred between the BS and the MD for at least a predetermined amount of time; or
determining that no command has been sent from the BS to the MD within a time out period.

* * * * *